April 16, 1940.  J. T. ROBERTS  2,197,058
APPARATUS FOR MAKING PISTON RINGS
Filed Sept. 27, 1937  3 Sheets-Sheet 1
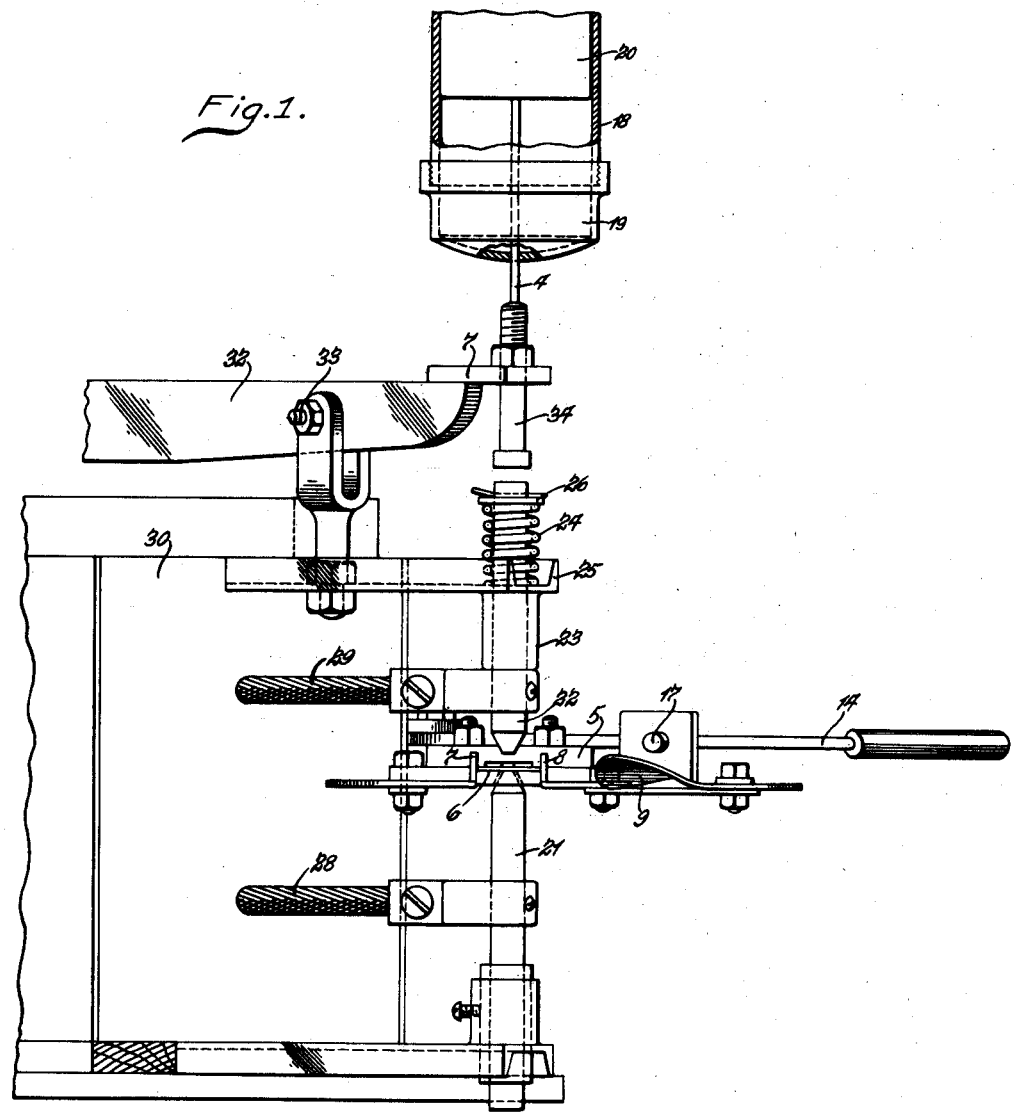
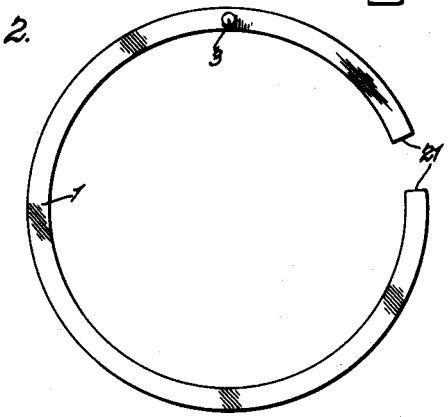
INVENTOR.
JOHN T. ROBERTS
BY *Rippey & Cassidy*
HIS ATTORNEYS.

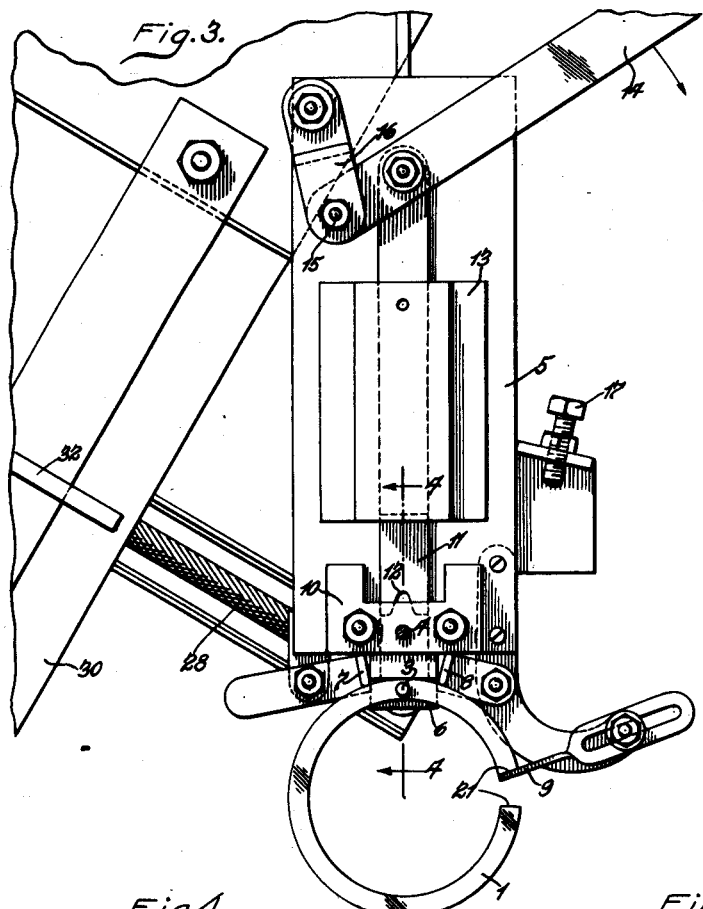

April 16, 1940.   J. T. ROBERTS   2,197,058
APPARATUS FOR MAKING PISTON RINGS
Filed Sept. 27, 1937   3 Sheets-Sheet 3
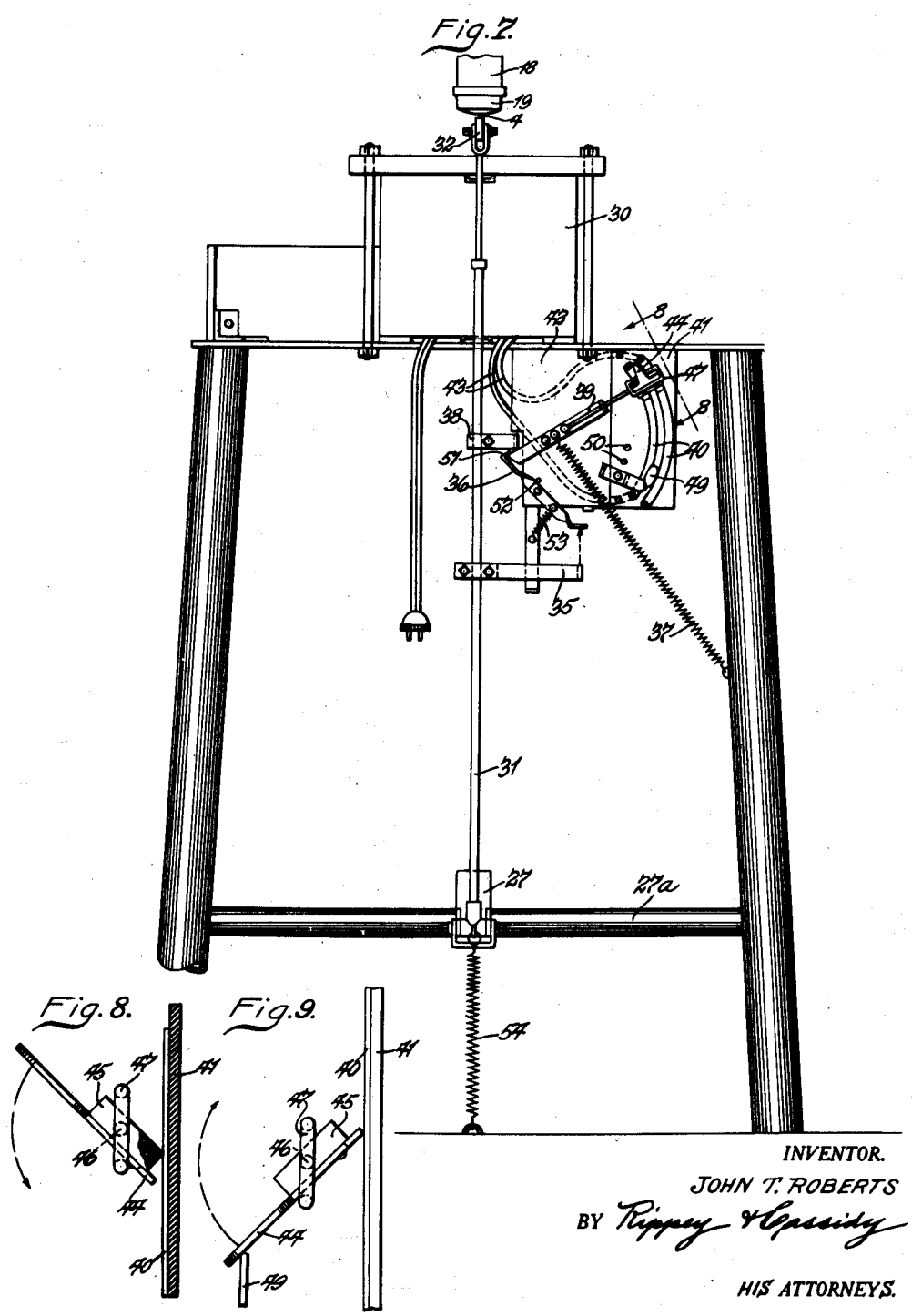
INVENTOR.
JOHN T. ROBERTS
BY *Rippey & Cassidy*
HIS ATTORNEYS.

Patented Apr. 16, 1940

2,197,058

UNITED STATES PATENT OFFICE 2,197,058

APPARATUS FOR MAKING PISTON RINGS

John T. Roberts, St. Louis, Mo.

Application September 27, 1937, Serial No. 165,830

3 Claims. (Cl. 219—4)

This invention relates to apparatus for making piston rings, and more particularly to apparatus for securing a spacing lug to a lamina of a ring, comprising a plurality of superimposed laminae. The piston ring to which this invention relates includes a number of thin laminae, usually four or five, placed one upon another in a single groove of a piston. Each lamina comprises an open circle, that is a circle having a gap which is nearly closed when placed in a cylinder for use. The gaps of the several laminae should be placed at spaced intervals about the piston so that no two will coincide.

To properly space the gaps of the laminae one with another a lug is secured to a lamina so that it will contact the ends of an adjacent lamina holding the two laminae in relative fixed position.

An object of this invention is to provide means for producing and securing such a spacing lug on a lamina so that it will be effective and at the same time not interfere with the resiliency of the lamina.

Another object of the invention is to provide efficient means for forming and welding such a lug to a lamina.

A further object of the invention is to provide apparatus suitable for electrically welding a lug to a lamina which will have means for automatically closing the welding circuit and keeping it closed only over a predetermined period of time, and after the lug previously formed has been clamped in position on a lamina to which it is to be welded.

Other objects and advantages will be apparent from the following detail description, taken in connection with the accompanying drawings, while the invention comprises the steps, parts and arrangements hereinafter described and particularly pointed out in the claims.

Fig. 1 is an elevation showing the front of an apparatus embodying the invention.

Fig. 2 is a plan view of a piston ring lamina with a lug attached by the method and apparatus of this invention.

Fig. 3 is a plan view showing in detail a part of the apparatus, including a work support and cut-off die which also acts as a positioning member for a slug later attached as a lug on the lamina.

Figs. 4, 5 and 6 are detail vertical sections showing the sequence of operations of the cut-off knife and the electrodes, approximately on line 4—4, Fig. 3.

Fig. 7 is a rear elevation of the apparatus.

Figs. 8 and 9 are details showing the construction and operation of a timing switch embodied in the apparatus, Fig. 8 being approximately on line 8—8, Fig. 7.

A piston ring to be made in accordance with this invention includes a plurality of laminae comprising thin rings having a gap which is nearly closed when the ring is placed in a piston and in a cylinder. The laminae are usually and conveniently formed by rolling ribbon steel stock into the form of a helix with a diameter of a size to suit the requirements of a particular piston ring. Each lamina is then separated from the helix by being cut therefrom, the severed portion being slightly less than the full circumference, thereby leaving a gap. Such a lamina is illustrated in Fig. 2 and indicated by the numeral 1, having a gap between the ends indicated by the numeral 2. Annealed stainless steel, including chromium and nickel, has been found satisfactory and is recommended for the laminae.

A lug 3 is welded to the face of a lamina, as shown in Fig. 3. This lug, preferably has a flat upper face and vertical walls, and is of approximately the same thickness as the lamina. It is so positioned that it will lie in the gap of an adjacent lamina so that the ends 2 of the adjacent lamina will engage the lug 3, thus holding the two laminae in fixed relative position.

To form the lug 3 a section of a bar 4 is sheared, as shown in Figs. 4, 5 and 6, producing a slug or blank having flat top and bottom faces with vertical walls and of a thickness substantially that of the lamina 1. The blank is then electrically welded to the face of the lamina 1. The stock for the bar 4 is preferably of soft, free-cutting, low carbon steel.

After the welding operation the lamina with the welded-on lug is tempered.

The foregoing comprises a simple description of the finished product and of the method of making it. Apparatus for efficiently cutting off the slug or blank to form the lug 3 and for welding it in position has been devised and is presently described.

The apparatus includes a support for a ring or lamina together with gauge devices, means for shearing a slug or blank and automatically placing it on the ring and apparatus for electrically welding the lug and the ring.

As specifically illustrated in the drawings, a support 5 has an outer projection or table 6 upon which the ring 1 may be placed. This support carries a plurality of adjustable gauges 7, 8 and 9, for positioning the ring. In particular the gauge 9 fixes the point in the circumference at which the lug 3 will be attached, it being understood that on different laminae of the same set the lugs will be differently placed so that the gaps of the laminae in the assembled piston ring will not coincide.

A guide member 10 for the lower end of the rod 4 is secured to the support 5 and forms a bridge for a cutting tool, knife or die 11 which may be manually reciprocated to cut a section from the lower end of the rod 4 and move the cut-off section or blank along the support 5 to the top face of the ring 1, as clearly shown in Figs. 4 and 5. The member 11 has a recess 12 in its forward end, as clearly shown in Fig. 3, and it is in this recess that the cutting edge is formed. This recess enables the member 11 to retain the blank while pushing it forwardly and to accurately position it on the ring 1. The knife or die member 11 is mounted for reciprocation along the support 5 and is held in position by a guide 13 secured to the support 5.

The knife or die member 11 is moved by a hand lever 14 pivoted to the rear end of the member 11, as shown in Fig. 3. The outer end of the lever 14 is connected by a pivot 15 to a link 16, which is pivoted at its rear end on the support 5. A stop member 17 carried by the support 5 limits the outer movement of the lever 14 so that the knife or die member 11 will be stopped in its forward motion when the blank for the lug 3 has been accurately positioned on the ring 1.

The rod is supported in a vertical position having its lower end passing through and guided in a hole in the member 10. Its upper end passes into a tube 18 through a hole in a bottom cap 19 on the end of the tube 18. A weight 20 in the tube 18 rests against the top end of the rod 4, causing it to feed downwardly whenever a cut has been made by the shearing member 11, as shown in Fig. 5, and the shearing member withdrawn, as shown in Fig. 6.

It will now be understood that a ring 1 may be placed on the projection 6 of the support 5, the projection or table being located, as clearly shown in Figs. 4, 5 and 6, so that the upper side of the ring supported thereon will be substantially level with the top of the support 5. Then by moving the lever 14 forwardly the die or knife 11 will cut a horizontal section from the lower end of the rod 4 and push it forwardly until the edge of the lever 14 contacts the plate 17, when the blade 11 will be in the position shown in Fig. 5, having pushed a blank or slug for the lug 3 to its proper position. Apparatus has been provided, which includes a pair of cooperating electrodes and switch operating mechanism, for electrically welding the blank to the ring 1 to form the lug 3.

One of these electrodes 21 is stationary and has its point extending upwardly through an opening in the projection 6, with its upper surface or point flush with the upper surface of the projection 6. The other electrode 22 is supported for vertical reproduction in a guide 23. An expansion spring 24 is interposed between a support 25 and a washer 26 secured at the upper end of the electrode 22, whereby the electrode 22 is held normally in upper position, as shown in Figs. 1 and 4. Means are provided, operable by a foot lever 27, for depressing the electrode 22 until it moves into clamping engagement with the blank for the lug 3, and then operates a timing switch connecting the electrodes in circuit for a definite period of time.

The electrodes are connected by cables 23 and 29 to the secondary of a transformer not shown, but enclosed within a transformer box 30.

The foot lever 27, a lever of the first class, fulcrumed on a frame member 27a, is connected at its outer end with a link 31, which extends from the lever 27 to an operating lever 32, also a lever of the first class, pivoted at 33 and carrying at its outer end a tappet 34 which is adapted to depress the electrode 22. The arrangement is such that the tappet 34 will completely depress the electrode 22 before other mechanism causes the timing switch to operate.

The timing switch is placed in operation by means of an arm 35 which is secured to the rod or link 31. When the foot lever 27 is operated the arm 35 moves in an upward direction contacting a latch 36 to release the time switch for operation in response to a tension spring 37. Upon the return or downward movement of the rod or link 31 an arm 38 also secured to the link 31 contacts an operating lever 39 of the switch, thereby restoring it to operative condition.

The means for operating the timing switch has been described, and the details of the switch will now be given so that its construction and operation will be understood.

A pair of arcuate conductor bars 40 are arranged on a non-conductive vertical face plate 41 on a support 42. Leads 43 are connected respectively to the bars 40 and are arranged in circuit so that when the arcuate bars 40 are connected they will complete a circuit to the primary of the transformer contained within the box 30. A conductor 44 is mounted on a non-conductive support 45 which is pivoted at 46 to a frame 47 on the outer end of the lever 39. The arrangement is such that when the outer end of the lever 39 moves downwardly or in a clockwise direction, Fig. 7, the support 45 will turn on its pivot so that the conductor 44 will contact the bars 40 and connect them; but when the lever 39 moves in a counter-clockwise direction the non-conductive support 45 will contact the bars and hold the conductor 44 away from them.

The lever 39 is pivoted at 48 to the support 42 and the spring 35 is connected to urge the lever in a clockwise direction.

A stop and throw member 49 is secured to the plate 41 and has an outer extended portion, Fig. 9, adapted to engage an outer extension on the conductor 44. Thus when the lever 39 moves in a clockwise direction, the stop 49 will engage the outer end of the conductor 44, at the end of the intended movement, turning the support 45 on the pivot 46 to throw the conductor out of engagement with the bars 40 as well as to stop the movement of the lever 39. A plurality of holes 50 are placed on the plate 41, so that the stop 49 may be secured in any of such holes, to regulate the length of throw of the lever 39 and controlling the time during which the bars 40 are connected.

The lever 39 is held in operative or cocked position by the latch 36 pivoted to the support 42. The upper end of the lever or latch 36 has a hook 51 to engage the inner end of the lever 39 and hold it in position while the lower end of the latch 36 is positioned to be engaged by the outer end of the arm 35. The clockwise movement of the lever or latch 36 is limited by a stop 52. The lever or latch is urged in a clockwise direction by a spring 53.

It will now be understood that upon movement of the foot lever 27 and upward movement of the link or bar 31 the outer end of the arm 35 will strike the lower end of the latch or lever 36 releasing the switch lever 39 to move under the force of its spring 37.

Upon release of the foot lever 27 it is returned by a spring 54 having a greater tension than the spring 37. Upon the return movement, the bar or link 31 moves downwardly causing the outer end of the arm 38, to engage the inner end of the switch lever 39, moving the lever 39 in a counter-clockwise direction until its inner end is placed in engagement with the hook 51 on the latch 36. The inner end of the lever 39 is bevelled, as shown in Fig. 7, so that it slips past the hook 51, whereupon the latch 36 is snapped into engaging position by its spring 53. The spring 53 is of such size and strength as to return the parts to normal position against the efforts of the springs 37 and 53.

The switch by its construction operates uniformly to connect the electrodes during the time necessary only for properly welding the lug 3 on the ring 1. This time is estimated at one-tenth of a second, although the period has been arrived at empirically. It is important that the current be supplied during the correct period because otherwise the lug will not be sufficiently welded or the ring or lug will be distorted.

In operating the device after the lever 14 has been moved to cut off and place a blank in the ring 1, as shown in Fig. 5, the foot lever may be depressed to place the electrode 22 in clamping position before the lever 14 is returned and the cut-off die 11 is retracted because a further depression of the foot lever 27 is necessary in order to place the switch in operation. As shown by the dotted line and arrow in Fig. 7 under the latch 36, considerable free movement is permitted before the switch is unlatched for operation.

It will be obvious from the foregoing description that the invention accomplishes its objects. A method has been provided for preparing the leaves of a laminated steel piston ring to produce an effective product, and simple and efficient apparatus has been provided for practicing that method and accomplishing the final results. Various changes may be made in the details of construction, within the scope of the appended claims, without departing from the spirit of this invention and parts of the invention may be used without the whole.

I claim:

1. Apparatus for forming and welding a lug to the face of a piston ring lamina, comprising a table for supporting the lamina in a horizontal position, a member movable horizontally in the plane of the upper surface of the lamina adapted to shear a cross section from a rod and to move said severed section to a predetermined position on the lamina, and electric welding apparatus for welding the section to the lamina while the lamina is located on the support and the section is positioned as aforesaid.

2. Apparatus for forming and welding a lug to the face of a piston ring lamina, comprising a horizontal table for supporting the lamina, means for supporting a bar in a vertical position, a cutting tool movable in substantially the same plane as the upper surface of the lamina and adapted to shear a cross section from an end of the bar, means including said tool for moving said severed section to a predetermined position on the lamina, and electric welding apparatus for welding the section to the lamina while the lamina is located on the table and the section is positioned as aforesaid.

3. Apparatus for forming and welding a lug to the face of a piston ring lamina, comprising a horizontal table for the lamina, means for supporting a bar in a vertical position, a cutting tool movable in substantially the same plane as the upper surface of the lamina and adapted to shear a cross section from the bar and move it to a predetermined position on the lamina, and electric welding apparatus for welding the section to the lamina while the lamina is located on the table and the section is positioned as aforesaid.

JOHN T. ROBERTS.